United States Patent
Manuel-Devadoss

(10) Patent No.: US 12,423,439 B2
(45) Date of Patent: Sep. 23, 2025

(54) AI BASED PATCH MANAGEMENT

(71) Applicant: ORACLE INTERNATIONAL CORPORATION, Redwood Shores, CA (US)

(72) Inventor: Johnson Manuel-Devadoss, San Antonio, TX (US)

(73) Assignee: Oracle Interntional Corporation, Redwood Shores, CA (US)

( * ) Notice: Subject to any disclaimer, the term of this patent is extended or adjusted under 35 U.S.C. 154(b) by 367 days.

(21) Appl. No.: 18/078,687

(22) Filed: Dec. 9, 2022

(65) Prior Publication Data

US 2024/0193277 A1 Jun. 13, 2024

(51) Int. Cl.
*G06F 21/57* (2013.01)
*G06F 21/55* (2013.01)

(52) U.S. Cl.
CPC .......... *G06F 21/577* (2013.01); *G06F 21/552* (2013.01)

(58) Field of Classification Search
CPC .................................................... G06F 21/577
USPC ............................................................. 726/25
See application file for complete search history.

(56) References Cited

U.S. PATENT DOCUMENTS

| | | | |
|---|---|---|---|
| 10,021,124 B2 * | 7/2018 | Oliphant | H04L 63/0227 |
| 10,282,193 B1 * | 5/2019 | Lanner | G06F 8/65 |
| 10,992,698 B2 | 4/2021 | Patel et al. | |
| 2013/0167238 A1 * | 6/2013 | Russell | H04L 63/1433 |
| | | | 726/25 |
| 2020/0092319 A1 * | 3/2020 | Spisak | G06N 7/01 |
| 2021/0211450 A1 | 7/2021 | Aleidan | |
| 2021/0390187 A1 | 12/2021 | Ahmed et al. | |
| 2022/0150271 A1 | 5/2022 | Shah | |
| 2022/0164645 A1 * | 5/2022 | Zaina | G06N 3/044 |
| 2023/0120174 A1 * | 4/2023 | Seck | G06F 21/566 |
| | | | 726/25 |

FOREIGN PATENT DOCUMENTS

CN 114117445 A 3/2022

OTHER PUBLICATIONS

Virginia Mayo; Three Ways IT Automation Simplifies Patch Management; pp. 1-6; Mar. 1, 2018; IBM.com Blogs.

(Continued)

*Primary Examiner* — Amare F Tabor
(74) *Attorney, Agent, or Firm* — Kraguljac Law Group LLC

(57) ABSTRACT

Systems, methods, and other embodiments associated with managing patches are described. In one embodiment, a method includes obtaining metadata associated with target assets in an IP address range. The target assets are scanned, and an initial list of security vulnerabilities and patches is generated along. A prediction model predicts which patches from the initial list are applicable to the target assets and removes unapplicable patches to generate a predicted list of patches. An interactive GUI is generated based on the predicted list of patches where each displayed patch includes an approve option and a reject option that are selectable by a user. An approved list of patches is generated which had the approve option selected. An electronic change request is automatically generated from the approved list of patches and presented for final approval, which causes the approved patches to be installed.

20 Claims, 6 Drawing Sheets

(56) References Cited

OTHER PUBLICATIONS

Zhang et al; A Machine Learning-Based Approach for Automated Vulnerability Remediation Analysis; pp. 1-9; Jun. 29, 2020; IEEE Conference on Communications and Network Security (CNS).
Micro Focus; ZENworks Patch Management (Data Sheet, Information Management and Governance); pp. 1-2; 2022.
Wang et al; PatchRNN: A Deep Learning-Based System for Security Patch Identification; pp. 1-6; Published Nov. 29, 2021; Journal Name: 2021 IEEE Military Communications Conference.
Kvalito; How to Validate an Autonomous Self-Patching System; pp. 1-9; Jul. 1, 2022; from: https://kvalito.ch/how-to-validate-an-autonomous-self-patching-system.
Zhou et al; SPI: Automated Identification of Security Patches via Commits; pp. 1-4; Published May 30, 2021.
Cambridge Technology; Patch Management as-a-Service (PMaaS) Secure Infrastructures with Patch Management as-a-Service; pp. 1-2.
Cambridge Technology: Remediate Vulnerabilities Faster & Minimize Cybersecurity Risks; p. 1.
Qualys; Qualys VMDR 2.0 with Qualys TruRisk, Redefining Cyber Risk Management; pp. 1-15; Qualys VMDR Datasheet; downloaded Dec. 9, 2022.

\* cited by examiner

Top-Level Asset List 300

| Asset IP Address (310) | DNS Name (320) | MAC Address (330) | Total (340) | Critical / High (350) |
|---|---|---|---|---|
| xxx.xxx.xxx.xxx | DNS Name 1 | MAC 1 | 17 | 14 / 3 |
| xxx.xxx.xxx.xxx | DNS Name 2 | MAC 2 | 17 | 14 / 3 |
| xxx.xxx.xxx.xxx | DNS Name 3 | MAC 3 | 17 | 14 / 3 |
| xxx.xxx.xxx.xxx | DNS Name 4 | MAC 4 | 17 | 14 / 3 |
| xxx.xxx.xxx.xxx | DNS Name 5 | MAC 5 | 17 | 14 / 3 |
| xxx.xxx.xxx.xxx | DNS Name 6 | MAC 6 | 17 | 14 / 3 |
| xxx.xxx.xxx.xxx | DNS Name 7 | MAC 7 | 17 | 14 / 3 |
| xxx.xxx.xxx.xxx | DNS Name 8 | MAC 8 | 17 | 14 / 3 |
| xxx.xxx.xxx.xxx | DNS Name 9 | MAC 9 | 17 | 14 / 3 |
| ... | ... | ... | ... | ... |
| xxx.xxx.xxx.xxx | DNS Name N | DNS Name N | 17 | 14 / 3 |

FIG. 3

| Asset - Plugin Name | Severity | Approval Options |
|---|---|---|
| Oracle Linux 7 : Unbreakable Enterprise kernel (ELSA-2020-5845) | Critical | Approve  Reject  Defer |
| Oracle Linux 7 : glib2 / and / ibus (ELSA-2020-3978) | Critical | Approve  Reject  Defer |
| Oracle Linux 7 : curl (ELSA-2020-3916) | Critical | Approve  Reject  Defer |
| Oracle Linux 7 : libpng (ELSA-2020-3901) | Critical | Approve  Reject  Defer |
| Oracle Linux 7 : webkitgtk4 (ELSA-2020-4035) | Critical | Approve  Reject  Defer |
| Oracle Linux 7 : nss / and / nspr (ELSA-2020-4076) | Critical | Approve  Reject  Defer |
| Oracle Linux 7 : python3 (ELSA-2021-9101) | Critical | Approve  Reject  Defer |
| Oracle Linux 7 : python (ELSA-2021-9107) | Critical | Approve  Reject  Defer |
| Oracle Linux 7 : libwebp (ELSA-2021-2260) | Critical | Approve  Reject  Defer |
| Oracle Linux 7 : olcne (ELSA-2021-9397) | Critical | Approve  Reject  Defer |

Interactive GUI 405

FIG. 4

AI BASED PATCH MANAGEMENT

BACKGROUND

Keeping a computing environment up to date with the latest software patches and updates is an important part of maintaining the computing environment. It is also an important requirement of an organization that maintains any security regulatory compliance such as PCI, FedRAMP, DOD, HIPPA, HITRUST, etc. However, applying patches to a computing environment introduces system downtime and extra workload.

Deciding which patches to install or which patches take priority over others may be difficult when there are thousands of patches available at any given time. For example, security patches should take precedence over non-security patches to avoid an attack. There is a huge labor-intensive effort to initiate a security scan on a weekly basis, manually review scan reports to determine the critical patches, and deciding which remediation steps to take. In such a case, for operations teams, manually identifying and applying security patches is time-consuming, labor-intensive, and error-prone.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments one element may be implemented as multiple elements or that multiple elements may be implemented as one element. In some embodiments, an element shown as an internal component of another element may be implemented as an external component and vice versa. Furthermore, elements may not be drawn to scale.

FIG. 3 illustrates one embodiment of a graphical user interface for a top-level asset list.

FIG. 4 illustrates one embodiment of an interactive GUI for selecting and approving patches.

DETAILED DESCRIPTION

Figure 1:
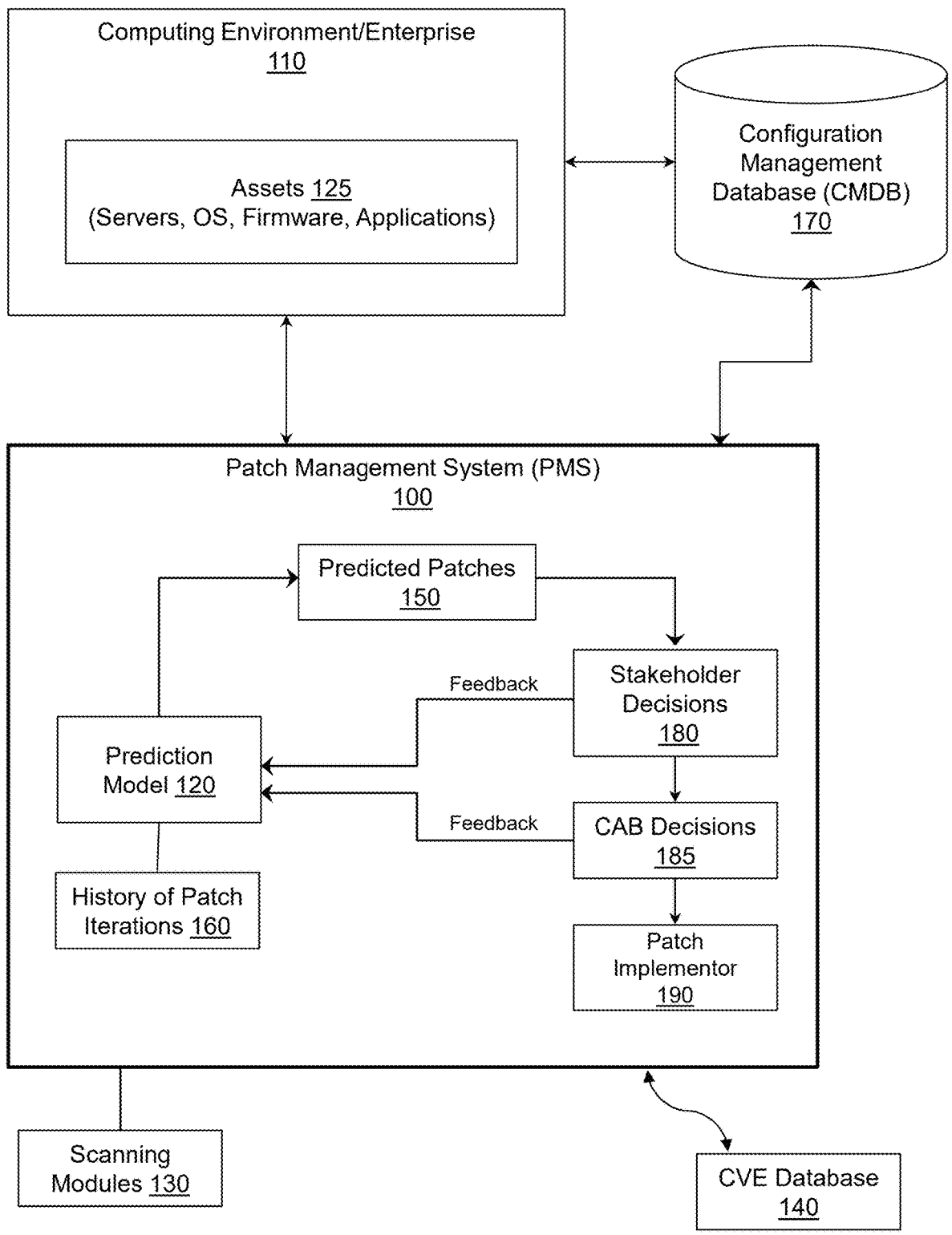
FIG. 1 illustrates one embodiment of a patch management system.

Systems and methods are described herein that provide a prediction-based patch management system for scanning a computing environment for security vulnerabilities, predicting, approving, and applying selected patches to resolve the security vulnerabilities. In one embodiment, the patching system includes a prediction model configured as an artificial intelligence (AI) model implemented with an algorithm based on deep reinforced learning (DRL) or Long Short Term Memory (LSTM), which is a recurrent neural network (RNN) architecture.

In one embodiment, the present patching system with AI prediction model automatically controls a security patching process from initiating a security scan to finalizing an approved list of patches for installation. The present patching system provides a more efficient process that is based on target configuration metadata, which reduces an amount of scanning performed on a target computing environment. The AI prediction model also predicts applicable/relevant patches for the target computing environment by identifying the most important and relevant patches (from a much larger set of available patches). The predicted patches may be based on a history of prior patches installed in the target computing environment and a vulnerability level (e.g., risk factors) that applies to the target computing environment. As such, the present system identifies patches that are relevant to the target environment, rather than installing all available patches that may be available to a computing environment in general.

Thus, the AI prediction model reduces the set of available patches to a necessary group of patches that are relevant to the target environment, which is a smaller and manageable amount of patches. This in turn reduces the number of patches that are installed in a computing environment and thus reduces system downtime associated with installing the patches. This also simplifies and improves the process of approving which patches to install, which typically includes a stakeholder/user reviewing the vulnerabilities and associated patches that are identified by a scan.

DEFINITIONS

"CVE" or "CVE database" as used herein, refers to the Common Vulnerabilities and Exposures (CVE) database/service. CVE is an independent service and database that identifies, classifies, and catalogs known software and firmware vulnerabilities and security issues. A vulnerability, in general, is a flaw in hardware, software, firmware, or other component having a weakness that may be exploited in a negative way. For example, a vulnerability may allow someone (an attacker who is unauthorized) to directly or indirectly access a system or network. The CVE assigns a unique ID to each vulnerability as CVE number and assigns an associated severity score. A CVE number uniquely identifies one vulnerability from the CVE database list of vulnerabilities (e.g., CVE-2018-14613).

As used herein, an "asset" refers to, but is not limited to, any component connected to or installed in a computing environment/network. Assets may be hardware, software, or firmware. Example assets include servers, network devices, switches, firewalls, virtual machines, desktops, laptops, operating systems, software applications, firmware, etc.

A "target asset" refers to an asset that has been selected and/or identified from other assets that is included in a scan to identify vulnerabilities.

As used herein, a "target computing environment" refers to, but is not limited to, a specified range of IP addresses that belong to the target computing environment. Assets that are within the specified IP address range (including software installed on the assets, are "target assets" for scanning purposes. Each asset has an assigned unique IP address that identifies a device/component on the internet or a local network. An asset is identified as being within a specified target computing environment based on its IP address. The full IP addressing range goes from 0.0.0.0 to 255.255.255.255.

A "configuration management database" (CMDB) refers to a centralized database that is maintained for a computing enterprise and/or computing environment that stores data associated with any assets that are configured within the computing environment. The maintained data may include identification of all assets in an environment and configuration data for all hardware and software assets. This may include, but is not limited to, system and application configurations, system architectures, asset dependencies, versions and update histories, etc. The CMDB provides visibility to all assets in a computing environment and/or enterprise. Data regarding an asset may be retrieved from the CMDB by querying or requesting the data via an API or other search tool. Since assets may change and/or be reconfigured in an enterprise, the CMDB is typically continuously maintained and updated to reflect asset changes. The CMDB may be maintained internally by an enterprise or by a third party (e.g., Servicenow.com).

System Overview

With reference to FIG. 1, one embodiment of a patch management system (PMS) 100 is shown that is configured with an artificial intelligence (AI) based prediction model 120. The PMS 100 is configured to scan a target computing environment/enterprise 110 that includes a variety of assets 125. The scan is performed by executing one or more scanning modules from a set of available scanning modules 130. In general, the scanning modules 130 are configured to scan assets and determine if any vulnerabilities are found. Scanning results are compared against a CVE database 140 of known vulnerabilities. The CVE database 140 also provides remediation actions for resolving each known vulnerability, which includes identifying patches that are recommended to be installed in assets.

The number of patches that may be recommended after a scan could be thousands of patches for a large computing system. Compound that number by executing scans on a weekly basis creates an unmanageable amount of patches that must be reviewed and decided upon. Furthermore, the importance or priority of any patch may vary from being not important (as applying to a non-severe, non-security related vulnerability) to being critical (as applying to a critically severe, security related vulnerability).

In one embodiment, the prediction model 120 is configured to predict which patches (e.g., predicted patches 150) are applicable to target assets that were scanned, thereby removing patches that do not apply and removing patches that are not a priority. After the predictions, the thousands of originally recommended patches may be reduced to hundreds of predicted patches 150. This is further described with reference to FIG. 2.

In one embodiment, the prediction model 120 is trained to predict and identify applicable patches based at least in part on a history of patch iterations 160 that were previously performed on the target assets 125. The predictions are based at least in part on metadata from the target assets 125 that is obtained from a configuration management database (CMDB) 170 that is maintained for the computing environment 120 and all the assets 125. This is further described with reference to FIG. 2.

The PMS 100 is configured with a patch approval process that provides the predicted patches and their associated remediation actions (from the CVE and scanning reports) to stakeholders/users for review. The PMS 100 further provides approval options via a graphical user interface (GUI) for allowing the stakeholder/users to decide and select appropriate actions for the each of the predicted patches (e.g., Approve patch for installation, Reject patch for installation, or Defer patch for installation). Examples are described with reference to FIGS. 3-4. The selected actions for a set of predicted patches 150 are recorded and stored as stakeholder decisions 180 to maintain a record of which patches were approved, which patches were rejected, and which stakeholder/user made the decisions.

In one embodiment, the decisions for each predicted patch (e.g., approved or rejected) may be returned to the prediction model 120 as feedback to improve the model prediction rate of the prediction model 120. For example, predicted patches that are approved are regarded as correct predictions and predicted patches that are rejected are regarded as incorrect predictions. This feedback may be used to tune/adjust the neural network of the prediction model 120 (e.g., the LSTM, DRL).

In one embodiment, the PMS 100 may then run/execute/install the approved patches (that were selected and approved by the stakeholders/users) against lower-level environments for testing purposes. Thus, only user selected and approved patches are installed. The lower-level environments are then scanned for vulnerabilities to verify that the vulnerabilities have been resolved by the patches.

Using the stakeholder approved patches and/or after the patches are tested, the PMS 100 may automatically generate and submit a change management request to have the approved patches installed to production environments with a preferred scheduled date(s). The change management request is provided to a change approval board (CAB) for final selection and approval of patches to install. Another GUI is generated similar to the GUI provided to the stakeholder that allows members of the CAB to select which patches to approve or reject. The selected actions made from the change management request (from the stakeholder approved patches) are recorded and stored as CAB decisions 185 to maintain a record of which patches were approved, which patches were rejected, and which CAB member made the decisions. The decisions for each predicted patch (e.g., approved or rejected) may be returned to the prediction model 120 as feedback to improve the model prediction rate of the prediction model 120.

The final CAB approved patches may then be fed into a patch implementor 190 that is configured as an executor component for executing/installing patches. Only the approved patches from the stakeholder and CAB are installed on the specific scheduled date and time as approved. The patches approved by the CAB may then be installed in the application production environment at the scheduled date/time. Additional details and examples of the PMS 100 is provided with reference to FIG. 2.

Patch Management Process

Figure 2A:
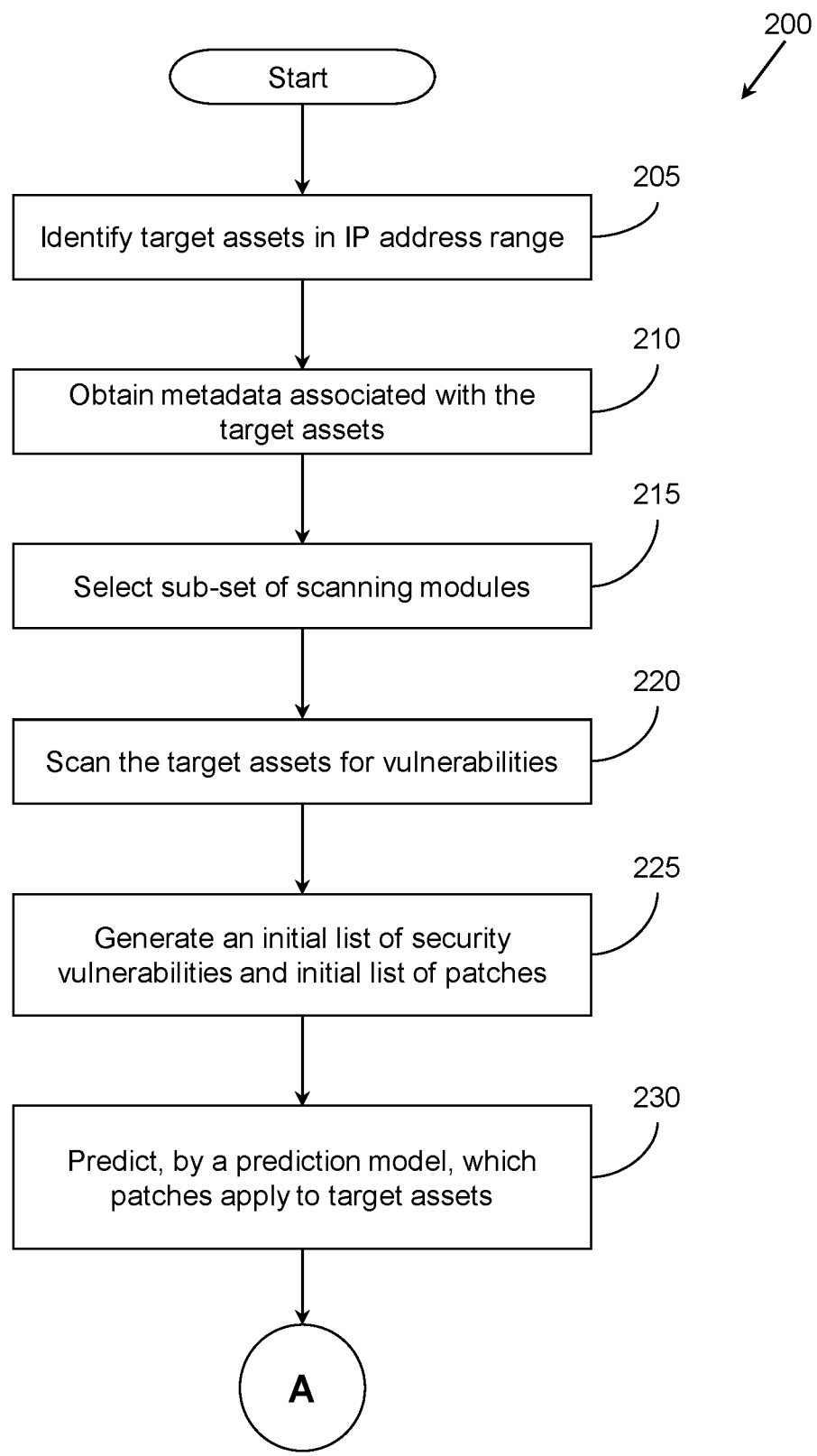
FIGS. 2A and 2B illustrate one embodiment of a method associated with the patch management system.

With reference to FIG. 2, one embodiment of a method 200 performed by the patch management system (PMS) 100 of FIG. 1 is illustrated. The patch management system (PMS) 100 is configured to automatically control a security patching process from initiating a security scan to predicting and finalizing an approved list of patches for installation. In one embodiment, the patching system 100 and method 200 are computer-implemented algorithms that may be configured with graphical user interfaces to obtain specified input data and display output as described herein.

A security scan executes one or more scanning algorithms/software that checks target assets within a computing environment to identify if any vulnerabilities exist. For example, the scanning software collects data points from scanned assets and categorizes the data points against one or more databases of known vulnerabilities such as the CVE database. Detected and identified vulnerabilities may arise from misconfigurations of hardware or flawed programming of software. Of course, there may be many different kinds of vulnerabilities that are defined in the CVE database.

To begin a security scan, the graphical user interface may request a specified IP address range to be inputted and/or selected within the computing environment that will be scanned. The specified IP address range limits the security scan to be performed on assets within the IP address range. This controls the scope of the scan and reduces time and computing resources from scanning the entire computing environment.

At block 205, the patch management system (PMS) identifies the assets in the computing environment that are within the specified IP address range. Since each asset (e.g., server, desktop, network device, etc.) has an assigned unique IP address, the PMS may identify which assets have an IP address that falls within the IP address range. In one embodiment, the system may query a configuration management database (CMDB) that is maintained for the computing environment to retrieve this metadata. The identified assets are the target assets for scanning purposes.

At block 210, the PMS obtains metadata associated with the identified target assets in the IP address range within the computing environment. The metadata identifies configuration properties of the target assets, which provide granularity for each target asset. For example, if the scan has 1000 IP addresses with the selected IP range, the PMS retrieves metadata from the CMDB that is associated with the assets that reside in this IP range. The metadata maintained in the CMDB may include a variety of information about each target asset and the PMS may be configured to retrieved particular metadata that will be used by the PMS. For example, the metadata may include data that identifies an asset ID, an asset name, the type of asset, an operating system (OS) type and configurations of the OS, programming languages present, software applications installed, version numbers of software, and other types of configuration data/properties that may be maintained in the CMDB about an asset.

At block 215, in one embodiment, the PMS determines how to scan the target assets and selects relevant scanning modules for the target assets. This determination is based on at least the information from the metadata that identifies the types and properties of the target assets. There may be a variety of different scanning modules that are available for performing vulnerability scans. Each scanning module may be configured for a particular type of asset and/or type of operating system. Thus, the PMS selects a subset of the available scanning modules that are relevant to the types of target assets to be scanned. This improves the efficiency of the scan process and reduces computing resources since fewer scans are performed and irrelevant scans are not performed. Additional details of the selection process of scanning modules are described below.

With continued reference to FIG. 2, at block 220, the PMS initiates a scan of the target assets for security vulnerabilities using the selected subsets of scanning modules. In one embodiment, the scanning modules may be configured to analyze installed executable code in the target assets, create signatures for the executable code, and compare the signatures to signatures corresponding to the original code of the same software. If any signature of the installed executable code is different, meaning that the code has changed, then the scanning module determines if the installed code is a vulnerability or not. Other types of scans may include collecting hardware configurations and determining whether the hardware configurations are a vulnerability or not. These are just some of the data points that may be collected from the target assets by the scanning modules.

The vulnerability determination is performed, for example, by categorizing the data points found by the scanning modules and comparing the data points against the Common Vulnerabilities and Exposures (CVE) database. As previously mentioned, the CVE is a service that identifies and catalogs known hardware, software, and/or firmware vulnerabilities. The CVE provides severity scores for each vulnerability included in the CVE database.

The specific details of how the scanning modules function with the CVE database is beyond the scope of this disclosure and is understood by those of ordinary skill in the art.

At block 225, an initial list of security vulnerabilities found by the scan are generated and an initial list of patches including remediation actions to resolve the security vulnerabilities are generated. The initial list of patches and the associated remediation actions are provided by and obtained from the CVE database. For each vulnerability, the CVE database maintains remediation actions, which may include installing a specified patch. The remediation actions identify and describe recommended steps that should be performed in order to resolve a corresponding vulnerability. Example remediation actions may recommend installing an identified patch for upgrading an application to the latest version number, changing a network port configuration setting, installing one or more patches to fix bugs in an operating system, etc.

Furthermore, the CVE database assigns a unique ID to each vulnerability and assigns a CVE severity score for each vulnerability that helps to prioritize the vulnerability. The CVE severity score is typically along a scale of 0-10 and is assigned based on an open set of standards. As such, the CVE score for a vulnerability applies generally to all computing environments and may not reflect the severity to a particular computing environment. For example, a CVE score of 0 means there is no severity, 0.1-3.9 means low severity, 4.0-6.9 means medium severity, 7.0-8.9 means high severity, and 9.0-10.0 means critical severity.

At block 230, the PMS predicts which patches and remediation actions are applicable to the target assets and removes unapplicable patches from the initial list of patches. Upon completion, the PMS generates a predicted list of patches (that will be provided to a stakeholder/user) that includes the patches that are predicted to be applicable, or otherwise relevant, to the target assets. In this manner, the predicted list of patches is a reduced version of the initial list of patches identified by the scan. The reduced version greatly reduces the time and effort for the stakeholder/user during an approval process described below.

For example, the scan process may have identified 1000+ vulnerabilities and associated patches. Thus, the initial list of patches includes 1000+ patches. However, after the predictions from the PMS that identify which patches are applicable or not applicable to the target assets, there may only be 100 predicted patches that are in the predicted list of patches.

In one embodiment, the PMS includes an artificial intelligence (AI) prediction model that is configured and trained to predict which patches are applicable/relevant to a particular set of target assets. For example, the prediction model may be implemented with a Long Short-Term Memory (LSTM), which is a recurrent neural network (RNN) architecture. It has feedback connections, unlike other neural networks which have feedforward architecture to process inputs.

In one embodiment, the LSTM prediction model is built and trained using a history of patch iterations that have been performed on the assets in the computing environment. In general, the prediction model learns what type of patches and what type of remediation actions were previously performed on which particular types of assets within the computing environment. The predication model implements deep learning, which is able to automatically extract features and learn their importance from training samples. In another embodiment, the prediction model may be implemented with other types of machine learning algorithms such as a Deep Reinforced Learning (DRL) algorithm.

In operation, to make patch predictions, the prediction model is configured to receive, as input, the remediation actions obtained from the scanning process and the metadata obtained from the target assets. The information from the scanning process provides text descriptions of the remediation actions associated with the initial list of patches. The metadata identifies at least the types of target assets and their properties currently being evaluated. The prediction model then predicts which remediation actions most likely apply to the target assets based on the learned history of patch iterations. In other words, the prediction model determines whether each remediation action is applicable to the target assets based at least in part on the history of patch iterations performed on the target assets.

For example, for a given input: the remediation actions that are recommended and the metadata of the target assets, the prediction model may predict whether the same or similar remediation actions were performed for the same asset type based on the learned history of patch iterations. Thus, the prediction model predicts a likelihood that the recommended remediation actions apply or do not apply to the current target asset types.

For example, suppose a remediation action from the initial list of patches identifies an update for a Log 4J-based asset (e.g., "upgrade Apache version 2 to the next version") and has a high CVE severity score. However, if the target assets that were scanned do not include a Log 4J-type asset or Log 4J-based application, the Log 4J remediation action and its corresponding patch is not relevant to the target assets. Thus, the Log 4J remediation actions and corresponding patch(es) and would be removed and not included in the predicted list of patches since it is not applicable to the current target assets.

In one embodiment, the recommended remediation actions and their corresponding patches may also be kept on the list or removed from the list based on their associated severity score. For example, a threshold score may be set and any patch that has a severity score lower than the threshold is removed/filtered out of the list. In general, the PMS system may be configured to only propose patches that are severe/important to a certain degree, for example, severity scores that are high or critical (e.g., scores 6-10). One reason for this is to minimize system downtime by only installing important patches and not installing (or deferring less important patches). In another embodiment, the CVE scores may be adjusted and modified based on risk factors that apply to the target assets. This is described below in the Modified Severity Scores and Risk Factors Embodiment.

After processing the inputted remediation actions and predicting the applicable/relevant patches, the PMS finalizes the predicted list of patches that are relevant to the target assets. In one embodiment, the predicted list of patches may be configured as an interactive, multi-level report. An example is described with reference to FIG. 3 and FIG. 4. The process continues in FIG. 2B.

Figure 2B:
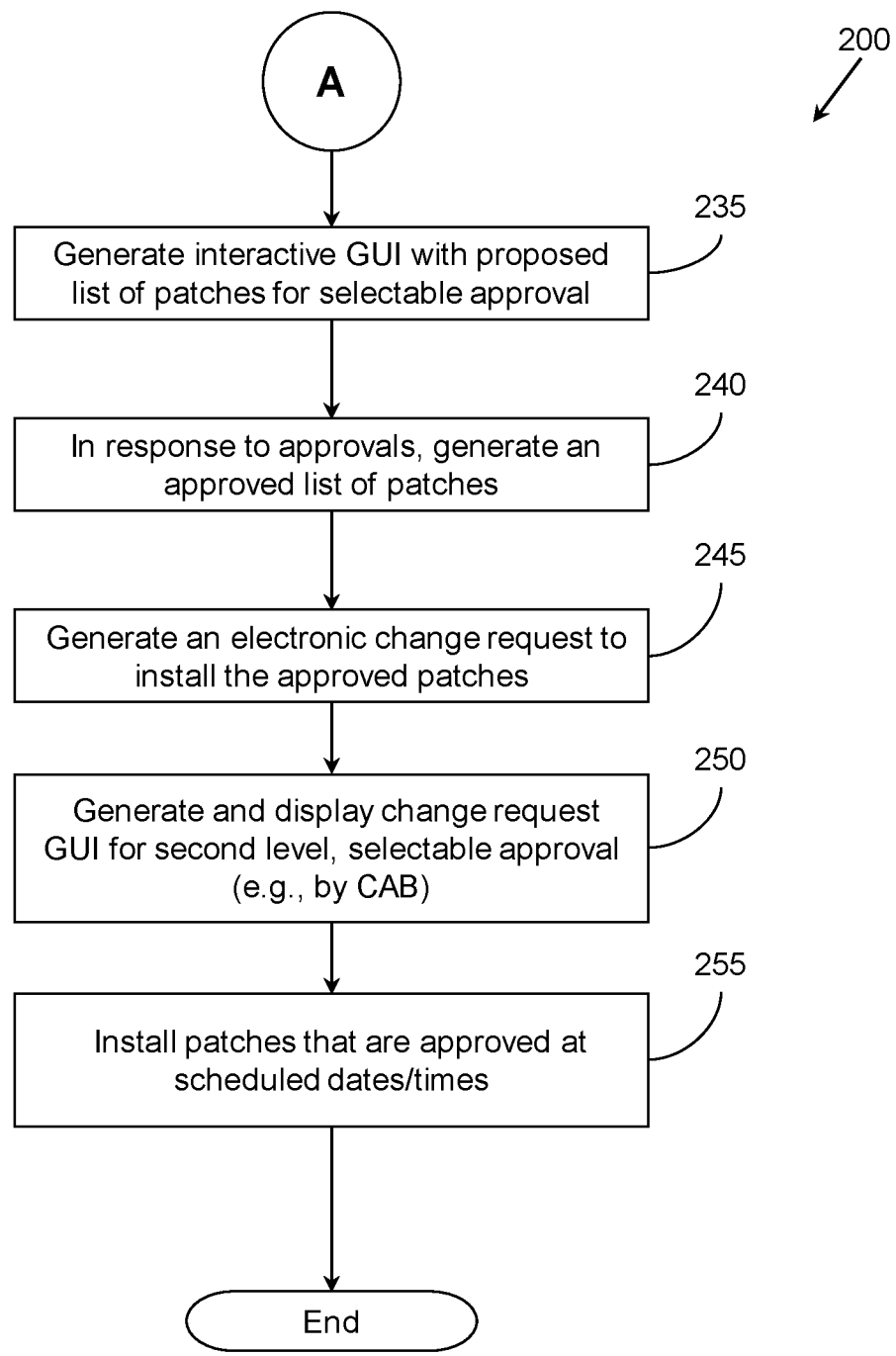

In FIG. 2B, at block 235, an interactive graphical user interface (GUI) is generated based on the predicted list of patches for display and approval on a display device (e.g., a monitor, a mobile device screen, a computer display screen, etc.). In one embodiment, the PMS generates and send a notification to one or more stakeholders/users that are associated with the target assets. The stakeholder/user may be an IT administrator/supervisor within an organization. The notification notifies the stakeholder/user that the vulnerability scan is complete and that the predicted list of patches should be reviewed.

The predicted list of patches may be transmitted for display on a computing device to be used by a stakeholder/user to select and approve patches for installation. In one embodiment, each displayed patch from the predicted list includes an approve option and a reject option on the interactive GUI that are selectable by the stakeholder/user. An example of the interactive GUI 405 is shown in FIG. 4 and explained below.

In one embodiment, for large corporations with large computing environments, this may be a first level of approval in a two-level patch approval process. The second level of approval is performed by a change approval board (CAB). The CAB, for example, may be a committee that makes final decisions for implementing changes to assets to ensure priorities and business impact are managed appropriately. The second approval step is described below.

In one embodiment, the predicted list of patches may be configured as an interactive, multi-level data structure where a first level identifies the applicable servers and other computing devices in the target assets along with a total number of vulnerabilities found on the device. One example of a top-level asset list 300 is shown in FIG. 3 and is generated as an interactive graphical user interface. Each asset IP address 310 identifies one target asset by their IP address, where the target assets are servers, user computing devices, or other hardware devices that have an assigned IP address. The asset IP addresses 310 are represented as generic numbers "xxx" in FIG. 3 for simplicity. The top-level asset list 300 may also include other identifying information such as a DNS name 320 of the asset, a MAC address 330, and a "Total" number of vulnerabilities 340 found in the asset from the scan (e.g., 17 vulnerabilities found). The total number may also be separated in column 350 into a number of critical severity vulnerabilities (e.g., 14 out of 17) and high severity vulnerabilities (e.g., 3 out of 17).

In the interactive asset list 300, by selecting (e.g., clicking on) a particular server/asset, the next level detail (more granular) is displayed for the selected server/asset. One embodiment is shown in FIG. 4. For example, a predicted list of patches 400 may be displayed for the selected server as another interactive graphical user interface 405. The predicted list of patches 400 may be listed based on the software assets that had the most critical vulnerabilities found during the scan.

Each item listed may be identified by their asset name 410, for example, the name of an operating system, the name of an application, the name of software module, etc. In FIG. 4, each software asset 410 is identified by their plugin name and, when applicable, a software package that includes the plugin, which is "Oracle Linux 7" in the example. Thus, the GUI 405 shows that multiple vulnerabilities were found in the software package Oracle Linux 7. Each listed asset (e.g., plugin or other software module) may also include a severity level 420 that was determined for the vulnerability associated with the asset. A total number of vulnerabilities found may also be displayed for each item.

In one embodiment, next to each asset name may be a reference number. For example, for the software asset plugin name "Unbreakable Enterprise kernel," a reference number "ELSA-2020-5845" is shown. ELSA refers to Enhanced Linux System Accounting, which is software that runs in Linux. This reference number identifies all the patches associated with the vulnerability found for the software asset. In the remediation actions that are obtained from the CVE database, the actions include a solution to the vulnerability. The solution includes a link/website address/reference to the patches for the corresponding asset and vulnerability, and this solution is identified by the reference number.

Thus, by going to the location of the reference number ELSA-2020-5845 (e.g., https://linux.oracle.com/errata/ELSA-2020-5845.html), it identifies all the update packages by filename. These are the patches to resolve the vulnerabilities for the associated software asset. Of course, different reference numbers are used to uniquely identify different patch solutions for different assets.

Although not explicitly shown in FIG. 4, each listed asset 410 has an associated patch and a description of remediation actions to resolve the vulnerability that was found for each asset (each plugin). As previously explained, the remediation actions and patches were previously obtained from the CVE database.

Thus, the listing 400 is a version of the predicted list of patches that is generated by the predictive model. It is noted that the predicted list of patches may not be a list of actual patch names but rather a list of assets that should be patched, and may include additional patch information (e.g., a link to the relevant patches), in one embodiment.

With continued reference to FIG. 4, in one embodiment, each displayed asset/patch from the predicted list 400 includes approval options 430 such as an "approve" option and a "reject" option. These graphical options are configured to be selectable on the interactive graphical user interface (GUI) 405 by a stakeholder/user to either approve installation of a patch or reject installation of the patch. This functionality allows the stakeholder/user to select appropriate remediation actions to take to resolve the vulnerabilities. The GUI 405 and predicted list 400 may also include a "defer" option with each identified patch to defer the decision about a patch.

In another embodiment, the predicted list of patches 400 may display the associated remediation actions/steps for each of the listed assets. For example, the remediation actions/steps for each listed asset may be displayed separately under the listing 400 and/or may be displayed upon selected (clicking on) an asset in the listing 400. In this manner, the predicted patches and associated remediation actions make it easier and more efficient for the stakeholder/user to review details of the predicted patches and make decisions whether to approve or reject each predicted patch.

Table 1 shows one embodiment of vulnerability descriptions and associated remediation actions that may be displayed for a selected software asset. This data is obtained from the CVE database as previously explained.

TABLE 1

Plugin Name: Oracle Linux 7: Unbreakable Enterprise Kernel (ELSA-2020-5845)
Synopsis: The remote Oracle Linux host is missing one or more security updates.
Description: The remote Oracle Linux 7 host has packages installed that are affected by multiple vulnerabilities as referenced in ELSA-2020-5845 advisory:
A flaw was found in the Linux kernel's NFS41+ subsystem. (CVE-2018-16884)
An infinite loop issue was found in the vhost_net kernel module in Linux Kernel . . . (CVE-2019-3900)
AI Model Predicted Recommendation Remediation: Update the affected packages with the latest update software/patches for this package.
See Also: https://linux.oracle.com/errata/ELSA-2020-5845.html
CVE: CVE-2018-14613, CVE-2019-3900, CVE-2018-16884 . . .

In Table 1, the software asset is "Oracle Linux 7" and the plugin "Unbreakable Enterprise Kernel" from FIG. 4. ELSA-2020-5845 is the reference that identifies all the patches for this issue. The "Synopsis" is a summary of the vulnerabilities/issues found during the scan. The "Description" describes each vulnerability issue found, which may include multiple issues. The "AI Model Predicted Recommendation Remediation" is the predicated recommended remediation from the AI prediction model 120, which identifies the recommended remediation action(s) to resolve the issues. For example, the recommended remediation is to install the associated patches to update the affected software asset. The "See Also" field identifies the location of a document that identifies the associated patches. The "CVE" field identifies all the CVE reference numbers for each identified vulnerability issue.

The description of the vulnerability issues and the associated remediation actions to resolve the issues provides relevant information for the stakeholder/user. This allows the stakeholder/user to decide and select whether to approve or reject an associated patch on the interactive GUI 405.

With reference again to FIG. 2, the patching management process 200 continues at block 240 after the approval or rejection selections made from the predicted list of patches 400 are completed. In response to approval selections made on the graphical user interface, the patch management system (PMS) generates an approved list of patches which have the approve option selected.

For example, when the stakeholder/user selects an approve option 430 for an asset/patch, the PMS adds the corresponding asset/patch to the approved list of patches to be installed. Patches that are rejected for installation (or deferred) are not included in the approved list. The selected actions by the stakeholder/user (e.g., approve, reject, etc.) may be recorded and stored as stakeholder decisions 180 (see FIG. 1) to maintain records/evidence of which patches were approved, which patches were rejected, and which stakeholder/user made the decisions. The PMS may record the identity of the stakeholder/user that made the approvals as electronic evidence about who approved the patches for auditing purposes. The identity may be obtained from user login credentials, for example. Previous techniques involved verbal discussions about patches and verbal approvals between users. Thus, no recorded evidence was created.

In another embodiment, after the approved list of patches is completed by the stakeholder/user, the approved list of patches may be tested prior to deployment in a production environment to ensure that patches in fact resolve vulnerabilities. For example, the selected and approved patches may be installed against lower-level environments in the computing environment. Thus, the associated software assets are updated by the patches. Then, the vulnerability scan is executed again to collect an updated scanning report to determine whether the installed patches actually resolved the vulnerabilities they were stated to fix. This process may be used to validate whether a patch worked or did not work.

Patches that do not resolve their associated vulnerabilities may then be removed from the approved list of patches and are not included in the next steps of the patching process. Thus, the removed patches are not included in a change request (block 245). As a result, the removed patches will not be reviewed by the next approval level, which in this example includes a change approval board (CAB) and will not be installed subsequently in a production environment.

Additionally, the patches may be tested to determine if any issues are created after installation. For example, patches may be tested to ensure they meet system requirements of the server (and vice versa) on which they will be installed and do not create conflicts. The testing may include determining whether a patch causes interference or conflicts with other systems. For example, dependent systems or applications may not work correctly or even go down following a server update with the patches. Patches that create such issues may also be removed from the approved list of patches and not continue in the patching process.

At block 245, after completion of the patch approval process by the stakeholder/user, the PMS automatically generates an electronic change request that requests to install the approved list of patches in the computing environment at a scheduled time period. The scheduled time period may be, for example, a proposed or preferred date and time for each patch and/or groups of patches that are proposed by the stakeholder/user who approved the patch.

In general, the change request is a structured form that may be part of a change management process. The change request, for example, identifies the approved list of patches, provides reasons for the patches, and requests/proposes that a specified computing environment (e.g., the system(s) that include the target assets) be modified by installing the patches.

At block 250, in one embodiment, a graphical user interface (GUI) may be generated to display the change request (e.g., a change request GUI) with interactive selectable functions in a similar manner as the interactive GUI 405 of FIG. 4. The electronic change request may be transmitted to a remote device for final approval. This creates a second level of selectable patch approval after the first level stakeholder/user approval. For example, the electronic change request may be submitted to one or more devices associated with one or more members of a change approval board (CAB). The electronic change request may be stored in a server/cloud location that is accessible by CAB members via a network connection. The CAB may then review the change request via the interactive change request GUI that shows the previously approved list of patches.

Thus, the patches from the previously approved list of patches (which were approved by the stakeholder/user) are selectable for final approval or rejection. For example, the change request GUI is generated with selectable approval and rejection options for each patch and/or for groups of related patches. Any proposed installation dates/times for the patches may also be modified via the change request GUI if different dates/times are decided to be less impactful on the computing environment and/or on the users.

At block 255, in response to one or more patches of the approved list of patches being selected for final approval from the electronic change request, the PMS initiates installation of only the one or more patches that were approved into the computing environment at the scheduled time period. The scheduled time period may be different for different assets or the same time. For example, the PMS may submit installation instructions to cause the approved patches to be installed on each asset at their associated scheduled time period that was approved. In one embodiment, an automated patch management system may control the patch installation on the target assets based on the installation instructions. This may be performed, for example, by the patch implementor 190 (shown in FIG. 1).

The present patch management process may be repeated at periodic intervals to ensure all servers and applications are up to date against security vulnerabilities.

Overall and in general, the present patch management process improves and provides advantages over prior techniques. For example, after a vulnerability scan is performed, the present system creates an interactive report for stakeholders/users that allows them to determine and identify what patches they want by selecting patches (or categorizing patches) for approval for their target environment. Then the present system automatically creates a Change Request with the selected patches (e.g., creates a Change Management Ticket) that is also interactive with selectable approve and reject options for CAB approval. Once CAB approves, then all the approved patches are executed and installed for the stakeholder during the proposed time and date, which was approved by CAB reviewers.

Selection of Scanning Modules Embodiment

In one embodiment, as discussed with reference to block 215 of FIG. 2, the patch management system (PMS) and the predictive model are configured to select a subset of scanning modules from an available set of scanning modules. Selecting a subset and only executing the subset of scanning modules reduces the amount of scanning performed by the system. For example, scanning modules that are relevant to the target assets are selected.

In one embodiment, the selection is based on at least the asset types of the target assets. The asset types are determined at least in part on the configuration properties from the metadata obtained for the target assets. Recall that in one embodiment, the scan is performed within a specified IP address range and thus includes a particular group of target assets that belong to that IP address range. The subset of scanning modules selected include modules that are configured to scan the asset types for security vulnerabilities. Modules that are configured to scan asset types that are not present in the target assets are not selected. Thus, only the selected scanning modules are executed to scan the target assets for security vulnerabilities.

For example, there may be a variety of different scanning modules that are available for performing vulnerability scans. Each scanning module may be configured for a particular type of asset and/or type of operating system. Thus, the PMS selects a subset of the available scanning modules that are relevant to the types of target assets to be scanned. This improves the efficiency of the scan process and reduces computing resources since fewer scans are performed and irrelevant scans are not performed.

One or more scanning modules may be configured to scan Windows-based operating systems, while other scanning modules may be configured to scan Mac-based operating systems. A Windows-based scanning module should not be executed on a Mac-based operating system, or vice versa, because the scan will not work and/or will not properly identify vulnerabilities. Thus, a target server that is configured with a Windows-based operating system should be scanned with scanning modules configured to scan Windows-based assets. Scanning modules configured to scan non-Windows-based assets may be filtered out of the selected subset of modules and thus not executed.

In one embodiment, the CMDB and/or cloud service provider maintains the metadata about servers, user devices, and all assets that are configured within a computing environment. The metadata may be retrieved via an API. For example, the PMS is configured to request and obtain the metadata associated with the target assets by querying the configuration management database (CMDB) or equivalent database that contains the metadata associated with the target assets.

As previously explained, the metadata provides details/properties about the servers/assets. For example, metadata properties for a server may identify the server ID, what is the OS, which version of the OS, CPU configurations, RAM configurations, a list of applications that are installed and/or running on the server, what types of programming languages are running on the server, etc. The prediction model uses the metadata to identify which scanning modules to select that correspond to the particular asset types and/or configurations. In one embodiment, the prediction model is implemented with an LSTM algorithm built and trained with features from asset type descriptions obtained from metadata and types/configurations from different scanning modules that are known to work properly with particular asset types.

Thus, based on the metadata from the target assets, the PMS selects a subset of scanning modules from the available set of scanning modules based at least in part on the configuration properties of the target assets. The set of scanning modules selected are ones that are configured to scan for security vulnerabilities associated with the configuration properties of the target assets.

In another example, based on the metadata received from the CMDB, the PMS may determine that a server or other device (a target asset) is a Windows-based device, and another device/asset has Java-based applications installed, or Python-based applications, or Oracle-based applications. If the target assets include Windows-based operating systems, then the PMS selects scanning modules configured to scan that operating system. If the target assets do not include any Java-based assets, Python-based assets, or other types of available programming languages, then the PMS does not select scanning modules configured to scan those asset types. In this manner, the PMS selects scanning modules that are related to the particular types of target assets.

Selecting and adding only particular scanning modules to be executed filters/reduces the set of available scanning modules to a smaller number. Thus, the amount of scanning performed is reduced. This, for example, optimizes the entire scanning process in terms of reducing computing resources used, reducing the scanning time, and reducing system down time while performing the scans.

Prior scanning techniques were inefficient because they executed all available scanning modules to scan everything on servers (e.g., all types of assets) regardless of relevance to the computing environment and regardless of whether the asset type existed or not on the server. Scanning everything with all scanning modules requires much more execution time, more computing resources, and causes a larger amount of system downtime.

Feedback to Prediction Model Embodiment

In one embodiment, the patch management system (PMS) is configured to provide feedback to the AI prediction model for the patch predictions made in FIG. 2, block 230 and the approval and rejection decisions made in block 235 from stakeholders and/or the approval/rejection decision from the CAB. In one embodiment as shown in FIG. 1, the stakeholder decisions 180 and/or the CAB decisions 185 may be provided as feedback to the prediction model 120. The feedback helps to retrain or adjust the prediction model to correct the patch predictions that were incorrect. For example, patches predicted by the prediction model 120 that are approved for installation by stakeholders are regarded as correct predictions and predicted patches that are rejected for installation are regarded as incorrect predictions.

As described in FIG. 2, block 235, the stakeholder/user selects which predicted patches to approve for installation or reject using the selected approval options (e.g., FIG. 4, approval options 430). A patch may be rejected for installation for various reasons such as the patch does not apply to the target asset, the predicted patch is not for a security vulnerability, the remediation actions do not apply to the target asset, the patch does not have a threshold security severity score, or other reasons.

In response to the stakeholder/user selecting to approve a patch, this feedback is provided back to the prediction model to confirm the prediction by the prediction model was correct. In response to the stakeholder/user selecting to reject a patch, this feedback is provided back to the prediction model to indicate an incorrect prediction and to improve the prediction model. A prediction score (e.g., prediction rate) for the prediction model may improve based on the stakeholder/user rejecting certain patches.

Modified Severity Scores and Risk Factors Embodiment

As previously described with reference to FIG. 2, block 225, the scanning process collects data points and categorizes the data points against the CVE database to identify vulnerabilities. The CVE database assigns a unique ID to each vulnerability and assigns a CVE severity score for each vulnerability that helps to prioritize the vulnerability. The CVE severity score is typically along a scale of 0-10. For example, a CVE score of 0 means there is no severity, 0.1-3.9 means low severity, 4.0-6.9 means medium severity, 7.0-8.9 means high severity, and 9.0-10.0 means critical severity.

However, the CVE severity score is assigned based on an open set of standards. As such, the CVE score for a vulnerability applies generally to all computing environments and may not reflect the severity to a particular computing environment or asset. Thus, in one embodiment, the present PMS adjusts or otherwise modifies the CVE severity score based on risk factors associated with the actual target assets that were scanned.

For example, the CVE severity score is adjusted to reflect the likelihood of severity to the target assets and/or based on how much damage or potential damage a particular vulnerability might cause to the target asset, to other dependent assets, and/or to users of the system. The damage is determined using risk factors associated with the target assets.

In one embodiment, the PMS defines one or more risk factors associated with the computing environment to adjust the severity score for a vulnerability. Values for each risk factor are determined from the metadata and the configuration properties of the target assets. A risk factor severity score is then determined for each defined risk factor, for example, as described below. Thus, after a CVE severity score is obtained for each of the security vulnerabilities from the CVE database, the PMS is configured to modify the CVE severity score for each of the security vulnerabilities based on the risk factor scores that apply to the target assets.

In general, the higher the value/metric for a risk factor, the higher the risk factor score it receives. For example, if 80% of all installed applications are affected by a vulnerability (a high percentage), then the risk factor score will be correspondingly high.

In one embodiment, the defined risk factors may include, but are not limited to, one or more of the following types of risk factors or metrics, whose value is determined from the metadata of the target assets:

(i) How many users are there in the target assets that will be affected by the vulnerability. The more users there are, the higher the risk score.
(ii) What is the level of user involvement in the target assets.
(iii) How many affected applications are installed in the target assets.
(iv) How many affected systems are in the target assets.
(v) How many dependent servers are there on a scanned target server. A dependent server is one that is configured to depend on another server (e.g., parent server). A parent server may have multiple dependent servers. The dependent servers might not be in the scanned IP address range and thus may not be part of the target assets that are scanned. As such, the potential damage of one server (from the target assets) going down from a vulnerability could be far beyond the target assets and cause a large amount of damage to other dependent servers not in the target group. Dependency information may be obtained by querying the CMDB for system for dependency and configuration information, which is part of the metadata.

(vii) How much reproducibility is there to recreate an entire server if the server goes down. For example, this is answered by determining how long will it take to recreate the entire server with all installed systems, applications, and configurations so that the server is back in production.

Risk scores for each risk factor may be defined by a user based on estimated impact on the target computing environment and its metric value. For example, the risk factor score for the number of affected users may be assigned relative to a total number of users such as distributing the risk scores 0-10 to the percentages of affected users 0%-100%. A lower percentage (or number) of affected users gets a lower risk score because the potential damage caused by a vulnerability is lower, and vice versa. Similar score assignments may be defined for other risk factors.

By using and incorporating one or more of these risk factor scores (or other selected types of risk factor scores), the PMS can generate a severity score for each vulnerability/patch that is customized for the target assets based on potential damage. In one embodiment, the original CVE severity score for a vulnerability is modified or otherwise weighted by the risk factor scores of the target assets. Thus, the modified CVE severity score is more accurate than the original CVE severity score. More accurate severity scores based on potential damage to the applicable computing environment may help to better prioritize which patches are more important and which are more highly recommended for installation.

In one embodiment, each risk factor score may be based on the same range of values as the CVE severity score, for example, 0-10. A total risk factor score for a patch/vulnerability is also in the same range between 0-10. One algorithm to calculate the total score is based on the averages of all the risk factor scores for each metric about damage.

For example, a patch XYZ has a vulnerability with a CVE severity score of 4.2 (medium severity). The PMS determines risk factor scores for the metrics such as: number of affected users=7.5; number of dependent servers=8.5; number of affected applications=6.0. Other risk scores can be determined and included in the calculation. The risk scores may be averaged for a total risk score of 7.33 (high severity).

The total risk score 7.33 can then be combined with the CVE severity score 4.2 in different selected ways to generate a final severity score (e.g., to generate a modified CVE severity score). For example, the modified CVE severity score may be an average of the two scores (=5.76), or may be combined by giving the total risk score an additional weighting factor to raise the final risk score.

As another example of determining potential damage from risk factors, suppose a target asset is a control server (e.g., a main server). The PMS and AI prediction model determines dependency configurations (one risk factor metric) for each target asset by querying for such information from the CMDB (e.g., or Service Now, etc.) via an API. Based on the returned metadata from the CMDB, the prediction model may determine that the control server has a number of dependent child servers, which function under the control server. Thus, any potential damage to the control server due to a vulnerability will cause damage to all the other child dependent servers connected to the control server. This would increase the risk factor score for this metric.

In a large computing environment, there may be 100+ child servers that depend on a control server. If the control server goes down, the potential damage is not one server, which may be medium severity. The potential damage is one control server and 100+ dependent servers going down, which is heavy damage and critical severity. This would increase the risk factor score for this metric to 9.0-10.0. Thus, a higher number of dependencies of an asset affects the potential damage for the asset and increases the risk factor score.

Cloud or Enterprise Embodiments

In one embodiment, the patch management system (PMS) 100 is a computing/data processing system including an application or collection of distributed applications for enterprise organizations. The applications and computing system 100 may be configured to operate with or be implemented as a cloud-based networking system, a software as a service (Saas) architecture, or other type of networked computing solution. In one embodiment the PMS 100 is a centralized server-side application that provides at least the functions disclosed herein and that is accessed by many users via computing devices/terminals communicating with a computing system (functioning as the server) over a computer network.

In one embodiment, one or more of the components described herein are configured as program modules stored in a non-transitory computer readable medium. The program modules are configured with stored instructions that when executed by at least one processor cause the computing device to perform the corresponding function(s) as described herein.

Computing Device Embodiment

Figure 5:
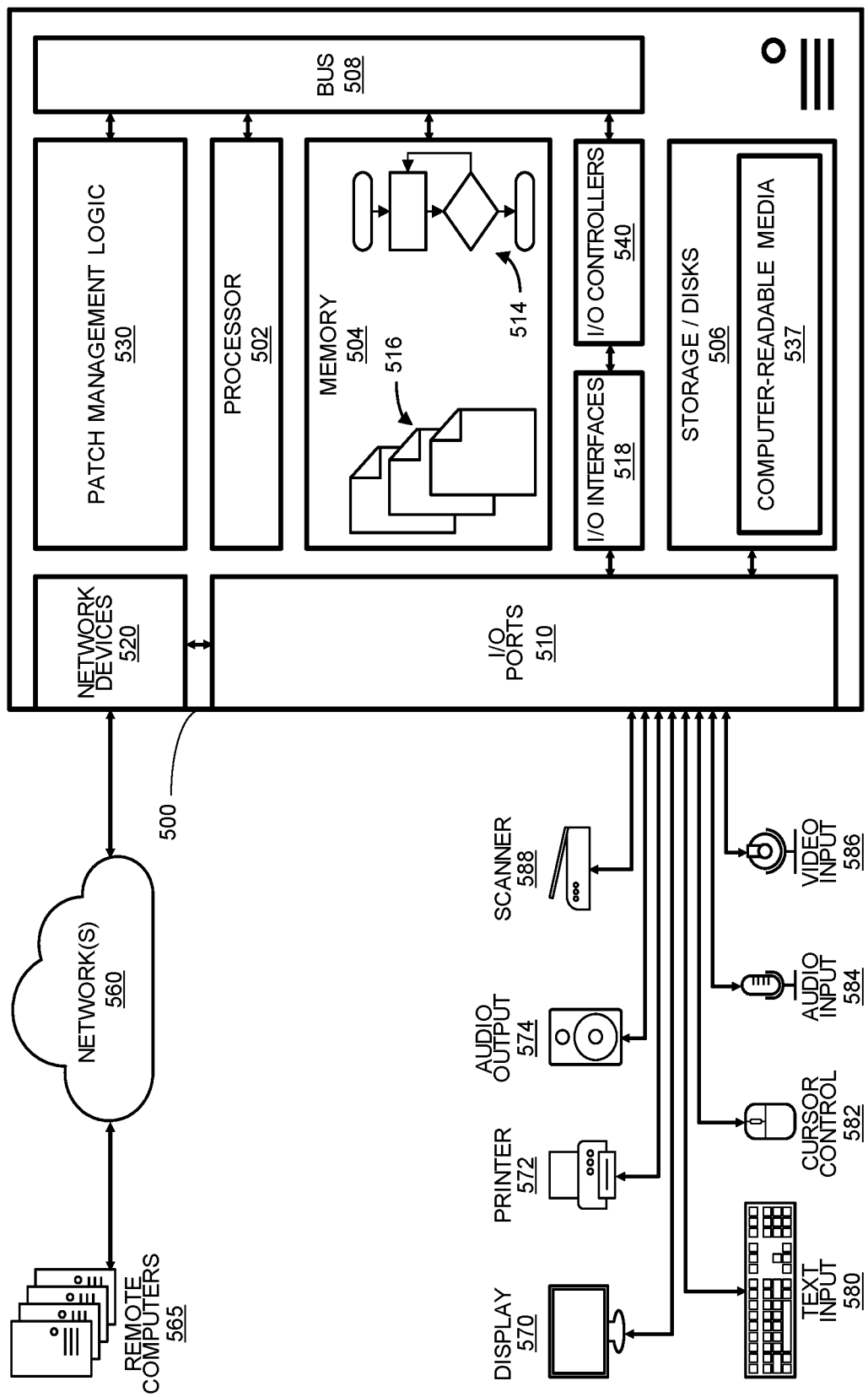
FIG. 5 illustrates an embodiment of a computing system configured with the example patch management systems and/or methods disclosed.

FIG. 5 illustrates an example computing device that is configured and/or programmed as a special purpose computing device with one or more of the example systems and methods described herein, and/or equivalents. The example computing device may be a computer 500 that includes at least one hardware processor 502, a memory 504, and input/output ports 510 operably connected by a bus 508. In one example, the computer 500 may include patch management logic 530 configured to facilitate a patch management process similar to patch management system 100 and method 200 shown in FIGS. 1-4.

In different examples, the logic 530 may be implemented in hardware, a non-transitory computer-readable medium 537 with stored instructions, firmware, and/or combinations thereof. While the logic 530 is illustrated as a hardware component attached to the bus 508, it is to be appreciated that in other embodiments, the logic 530 could be implemented in the processor 502, stored in memory 504, or stored in disk 506.

In one embodiment, logic 530 or the computer is a means (e.g., structure: hardware, non-transitory computer-readable medium, firmware) for performing the actions described. In some embodiments, the computing device may be a server operating in a cloud computing system, a server configured in a Software as a Service (SaaS) architecture, a smart phone, laptop, tablet computing device, and so on.

The means may be implemented, for example, as an ASIC programmed to perform the patch management process 200. The means may also be implemented as stored computer executable instructions that are presented to computer 500 as data 516 that are temporarily stored in memory 504 and then executed by processor 502.

Logic 530 may also provide means (e.g., hardware, non-transitory computer-readable medium that stores executable instructions, firmware) for performing the present patch management process.

Generally describing an example configuration of the computer 500, the processor 502 may be a variety of various processors including dual microprocessor and other multi-processor architectures. A memory 504 may include volatile memory and/or non-volatile memory. Non-volatile memory may include, for example, ROM, PROM, and so on. Volatile memory may include, for example, RAM, SRAM, DRAM, and so on.

A storage disk 506 may be operably connected to the computer 500 via, for example, an input/output (I/O) interface (e.g., card, device) 518 and an input/output port 510 that are controlled by at least an input/output (I/O) controller 540. The disk 506 may be, for example, a magnetic disk drive, a solid state disk drive, a floppy disk drive, a tape drive, a Zip drive, a flash memory card, a memory stick, and so on. Furthermore, the disk 506 may be a CD-ROM drive, a CD-R drive, a CD-RW drive, a DVD ROM, and so on. Memory 504 can store a process 514 and/or a data 516, for example. The disk 506 and/or the memory 504 can store an operating system that controls and allocates resources of the computer 500.

The computer 500 may interact with, control, and/or be controlled by input/output (I/O) devices via the input/output (I/O) controller 540, the I/O interfaces 518, and the input/output ports 510. Input/output devices may include, for example, one or more displays 570, printers 572 (such as inkjet, laser, or 3D printers), audio output devices 574 (such as speakers or headphones), text input devices 580 (such as keyboards), cursor control devices 582 for pointing and selection inputs (such as mice, trackballs, touch screens, joysticks, pointing sticks, electronic styluses, electronic pen tablets), audio input devices 584 (such as microphones or external audio players), video input devices 586 (such as video and still cameras, or external video players), image scanners 588, video cards (not shown), disks 506, network devices 520, and so on. The input/output ports 510 may include, for example, serial ports, parallel ports, and USB ports.

The computer 500 can operate in a network environment and thus may be connected to the network devices 520 via the I/O interfaces 518, and/or the I/O ports 510. Through the network devices 520, the computer 500 may interact with a network 560. Through the network, the computer 500 may be logically connected to remote computers 565. Networks with which the computer 500 may interact include, but are not limited to, a LAN, a WAN, and other networks.

Definitions and Other Embodiments

In another embodiment, the described methods and/or their equivalents may be implemented with computer executable instructions. Thus, in one embodiment, a non-transitory computer readable/storage medium is configured with stored computer executable instructions of an algorithm/executable application that when executed by a machine(s) cause the machine(s) (and/or associated components) to perform the method. Example machines include but are not limited to a processor, a computer, a server operating in a cloud computing system, a server configured in a Software as a Service (SaaS) architecture, a smart phone, and so on). In one embodiment, a computing device is implemented with one or more executable algorithms that are configured to perform any of the disclosed methods.

In one or more embodiments, the disclosed methods or their equivalents are performed by either: computer hardware configured to perform the method; or computer instructions embodied in a module stored in a non-transitory computer-readable medium where the instructions are configured as an executable algorithm configured to perform the method when executed by at least a processor of a computing device.

While for purposes of simplicity of explanation, the illustrated methodologies in the figures are shown and described as a series of blocks of an algorithm, it is to be appreciated that the methodologies are not limited by the order of the blocks. Some blocks can occur in different orders and/or concurrently with other blocks from that shown and described. Moreover, less than all the illustrated blocks may be used to implement an example methodology. Blocks may be combined or separated into multiple actions/components. Furthermore, additional and/or alternative methodologies can employ additional actions that are not illustrated in blocks. The methods described herein are limited to statutory subject matter under 35 U.S.C § 101.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

A "data structure", as used herein, is an organization of data in a computing system that is stored in a memory, a storage device, or other computerized system. A data structure may be any one of, for example, a data field, a data file, a data array, a data record, a database, a data table, a graph, a tree, a linked list, and so on. A data structure may be formed from and contain many other data structures (e.g., a database includes many data records). Other examples of data structures are possible as well, in accordance with other embodiments.

"Computer-readable medium" or "computer storage medium", as used herein, refers to a non-transitory medium that stores instructions and/or data configured to perform one or more of the disclosed functions when executed. Data may function as instructions in some embodiments. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an application specific integrated circuit (ASIC), a programmable logic device, a compact disk (CD), other optical medium, a random access memory (RAM), a read only memory (ROM), a memory chip or card, a memory stick, solid state storage device (SSD), flash drive, and other media from which a computer, a processor or other electronic device can function with. Each type of media, if selected for implementation in one embodiment, may include stored instructions of an algorithm configured to perform one or more of the disclosed and/or claimed functions. Computer-readable media described herein are limited to statutory subject matter under 35 U.S.C § 101.

"Logic", as used herein, represents a component that is implemented with computer or electrical hardware, a non-transitory medium with stored instructions of an executable application or program module, and/or combinations of these to perform any of the functions or actions as disclosed herein, and/or to cause a function or action from another logic, method, and/or system to be performed as disclosed herein. Equivalent logic may include firmware, a microprocessor programmed with an algorithm, a discrete logic (e.g., ASIC), at least one circuit, an analog circuit, a digital circuit, a programmed logic device, a memory device containing instructions of an algorithm, and so on, any of which may be configured to perform one or more of the disclosed functions. In one embodiment, logic may include one or more gates, combinations of gates, or other circuit components configured to perform one or more of the disclosed functions. Where multiple logics are described, it may be possible to incorporate the multiple logics into one logic. Similarly, where a single logic is described, it may be possible to distribute that single logic between multiple logics. In one embodiment, one or more of these logics are corresponding structure associated with performing the disclosed and/or claimed functions. Choice of which type of logic to implement may be based on desired system conditions or specifications. For example, if greater speed is a consideration, then hardware would be selected to implement functions. If a lower cost is a consideration, then stored instructions/executable application would be selected to implement the functions. Logic is limited to statutory subject matter under 35 U.S.C. § 101.

An "operable connection", or a connection by which entities are "operably connected", is one in which signals, physical communications, and/or logical communications may be sent and/or received. An operable connection may include a physical interface, an electrical interface, and/or a data interface. An operable connection may include differing combinations of interfaces and/or connections sufficient to allow operable control. For example, two entities can be operably connected to communicate signals to each other directly or through one or more intermediate entities (e.g., processor, operating system, logic, non-transitory computer-readable medium). Logical and/or physical communication channels can be used to create an operable connection.

"User", as used herein, includes but is not limited to one or more persons, computers or other devices, or combinations of these.

While the disclosed embodiments have been illustrated and described in considerable detail, it is not the intention to restrict or in any way limit the scope of the appended claims to such detail. It is, of course, not possible to describe every conceivable combination of components or methodologies for purposes of describing the various aspects of the subject matter. Therefore, the disclosure is not limited to the specific details or the illustrative examples shown and described. Thus, this disclosure is intended to embrace alterations, modifications, and variations that fall within the scope of the appended claims, which satisfy the statutory subject matter requirements of 35 U.S.C. § 101.

To the extent that the term "includes" or "including" is employed in the detailed description or the claims, it is intended to be inclusive in a manner similar to the term "comprising" as that term is interpreted when employed as a transitional word in a claim.

To the extent that the term "or" is used in the detailed description or claims (e.g., A or B) it is intended to mean "A or B or both". When the applicants intend to indicate "only A or B but not both" then the phrase "only A or B but not both" will be used. Thus, use of the term "or" herein is the inclusive, and not the exclusive use.

What is claimed is:

1. A non-transitory computer-readable medium that includes stored thereon computer-executable instructions that when executed by at least a processor of a computer cause the computer to:

obtain metadata associated with target assets in an IP address range within a computing environment, wherein the metadata identifies configuration properties of the target assets;

scan the target assets for security vulnerabilities;

generate an initial list of security vulnerabilities found by the scan and generate an initial list of patches including remediation actions to resolve the security vulnerabilities;

predict, by a prediction model, which patches from the initial list of patches are applicable to the target assets based on at least the remediation actions and remove unapplicable patches from the initial list of patches to generate a predicted list of patches;

wherein the prediction model is trained to identify applicable patches based at least in part on a history of patch iterations performed on the target assets;

generate an interactive graphical user interface based on the predicted list of patches for display on a display device that creates a first level of patch approval, wherein each individual displayed patch from the predicted list includes an approve option and a reject option that are selectable by a user to individually approve a specific patch from the predicted list of patches;

in response to selections made on the interactive graphical user interface, generate an approved list of patches which have the approve option individually selected;

generate an electronic change request that requests to install the approved list of patches in the computing environment at a scheduled time period;

generate and display a change request graphical user interface on a remote device that creates a second level of patch approval based on the electronic change request;

wherein change request graphical user interface includes one or more patches from the approved list of patches that are selectable for final approval in the second level of patch approval; and in response to one or more patches of the approved list of patches being selected for final approval in the second level of patch approval from the change request graphical user interface, install the one or more patches into the computing environment at the scheduled time period.

2. The non-transitory computer-readable medium of claim 1, wherein the instructions to scan the target assets further comprise instructions that when executed by at least the processor cause the processor to:

reduce an amount of scanning performed by:
selecting a subset of scanning modules from an available set of scanning modules based on asset types of the target assets, wherein the asset types are determined at least in part on the configuration properties of the target assets;
wherein scanning modules that are configured to scan the asset types of the target assets are selected for the subset of scanning modules;
wherein scanning modules that are configured to scan different asset types that are not part of the target assets are not selected for the subset of scanning modules; and
scanning the target assets for the security vulnerabilities by executing the subset of scanning modules selected.

3. The non-transitory computer-readable medium of claim 1,
wherein obtaining the metadata associated with the target assets includes querying a configuration management database that contains the metadata associated with the target assets that are present within the computing environment.

4. The non-transitory computer-readable medium of claim 1, further comprising instructions that when executed by at least the processor cause the processor to:
after scanning the target assets for security vulnerabilities:
categorize data points collected during the scan against a common vulnerabilities and exposures (CVE) database to determine which security vulnerabilities are present;
obtain a CVE severity score for each of the security vulnerabilities from the CVE database; and
modify the CVE severity score for each of the security vulnerabilities based on one or more risk factors that apply to the target assets;
wherein the one or more risk factors are determined from the metadata and the configuration properties of the target assets.

5. The non-transitory computer-readable medium of claim 1, further comprising instructions that when executed by at least the processor cause the processor to:
after scanning the target assets for security vulnerabilities:
generate a severity score for one or more of the security vulnerabilities found based at least in part on a potential damage to the target assets caused by the one or more security vulnerabilities;
wherein the potential damage is determined based at least in part on the configuration properties from the metadata of the target assets.

6. The non-transitory computer-readable medium of claim 5, further comprising instructions that when executed by at least the processor cause the processor to:
determine the potential damage to the target assets by determining one or more risk factors associated with the target assets including:
a number of affected users associated with the target assets in the IP address range;
a number of dependent servers that are configured to depend on a target server within the target assets, wherein the dependent servers are not within the IP address range; and
a number of affected applications that are installed on the target assets.

7. The non-transitory computer-readable medium of claim 1, further comprising instructions that when executed by at least the processor cause the processor to:
after generating the approved list of patches:
install the approved patches from the approved list of patches in at least one test environment of the computing environment;
determine whether the approved patches resolve a security vulnerability associated with each of the approved patches; and
remove a given patch from the approved list of patches that does not resolve the security vulnerability associated with the given patch.

8. The non-transitory computer-readable medium of claim 1, wherein the prediction model is configured to:
receive, as input, the remediation actions and the metadata of the target assets; and
determine whether each remediation action is applicable to the target assets based at least in part on the history of patch iterations performed on the target assets.

9. A method implemented on a computing system, the method comprising:
obtaining metadata associated with target assets in an IP address range within a computing environment, wherein the metadata identifies configuration properties of the target assets;
scanning the target assets for security vulnerabilities;
generating an initial list of security vulnerabilities found by the scanning and generating an initial list of patches including remediation actions to resolve the security vulnerabilities;
predicting, by a prediction model, which patches from the initial list of patches are applicable to the target assets based on at least the remediation actions and removing unapplicable patches from the initial list of patches to generate a predicted list of patches;
wherein the prediction model is trained to identify applicable patches based at least in part on a history of patch iterations performed on the target assets;
generating an interactive graphical user interface based on the predicted list of patches for display on a display device that creates a first level of patch approval, wherein each individual displayed patch from the predicted list includes an approve option and a reject option that are selectable by a user to individually approve a specific patch from the predicted list of patches;
in response to selections made on the interactive graphical user interface, generating an approved list of patches which have the approve option individually selected;
generating an electronic change request that requests to install the approved list of patches in the computing environment at a scheduled time period;
generating and displaying a change request graphical user interface on a remote device that creates a second level of patch approval based on the electronic change request;
wherein change request graphical user interface includes one or more patches from the approved list of patches that are selectable for final approval in the second level of patch approval; and
in response to one or more patches of the approved list of patches being selected for final approval in the second level of patch approval from the change request graphical user interface, installing the one or more patches into the computing environment at the scheduled time period.

10. The method of claim 9, wherein prior to scanning the target assets, the method further comprising:
reducing an amount of scanning performed by:
selecting a subset of scanning modules from an available set of scanning modules based on asset types of the target assets, wherein the asset types are determined at least in part on the configuration properties of the target assets;
wherein scanning modules that are configured to scan the asset types for security vulnerabilities are selected for the subset of scanning modules; and
scanning the target assets for the security vulnerabilities by executing the subset of scanning modules selected.

11. The method of claim 9, wherein
wherein obtaining the metadata associated with the target assets includes querying a configuration management database that contains the metadata associated with the target assets that are present within the computing environment.

12. The method of claim 9, further comprising:
after scanning the target assets for security vulnerabilities:
categorizing data points collected during the scanning against a common vulnerabilities and exposures (CVE) database to determine which security vulnerabilities are present;
obtaining a CVE severity score for each of the security vulnerabilities from the CVE database; and
modifying the CVE severity score for each of the security vulnerabilities based on one or more risk factors that apply to the target assets;
wherein the one or more risk factors are determined from the metadata and the configuration properties of the target assets.

13. The method of claim 9, further comprising:
after scanning the target assets for security vulnerabilities:
generating a severity score for one or more of the security vulnerabilities found based at least in part on a potential damage to the target assets caused by the one or more security vulnerabilities;
wherein the potential damage is determined based at least in part on the configuration properties from the metadata of the target assets.

14. The method of claim 13, further comprising:
determining the potential damage to the target assets by determining one or more risk factors associated with the target assets including:
a number of affected users associated with the target assets in the IP address range;
a number of dependent servers that are configured to depend on a target server within the target assets, wherein the dependent servers are not within the IP address range; and
a number of affected applications that are installed on the target assets.

15. A computing system, comprising:
at least one processor connected to at least one memory;
a non-transitory computer readable medium including instructions stored thereon that when executed by at least the processor cause the processor to:
identify, by the processor, an IP address range within a computing environment, wherein the IP address range is used to identify a set of target assets within the computing environment;
obtain metadata associated with the target assets that identifies configuration properties of the target assets;
select a subset of scanning modules from an available set of scanning modules based at least in part on the configuration properties of the target assets, wherein the set of scanning modules selected are configured to scan for security vulnerabilities associated with the configuration properties of the target assets;
scan the target assets for security vulnerabilities by executing the subset of scanning modules;
generate an initial list of security vulnerabilities found by the subset of scanning modules and generate an initial list of patches including remediation actions to resolve the security vulnerabilities;
generate a severity score for one or more of the security vulnerabilities in the initial list based at least in part on a potential damage caused by the one or more security vulnerabilities in accordance with the configuration properties from the metadata of the target assets;
input the remediation actions and the metadata of the target assets to a prediction model that is configured to determine whether the remediation actions of an associated patch are applicable to the target assets based at least in part on a history of patch iterations performed on the target assets;
remove unapplicable patches determined by the predictive model from the initial list of patches to generate a predicted list of patches;
generate an interactive graphical user interface based on the predicted list of patches for display on a display device that creates a first level of patch approval, wherein each individual displayed patch from the predicted list includes an approve option and a reject option that are selectable by a user to individually approve a specific patch from the predicted list of patches;
in response to selections made on the interactive graphical user interface, generate an approved list of patches which have the approve option individually selected;
generate an electronic change request that requests to install the approved list of patches in a production environment on the target assets at a scheduled time period;
generate and display, on a display device, a change request graphical user interface on a remote device that creates a second level of patch approval based on the electronic change request;
wherein change request graphical user interface includes one or more patches from the approved list of patches that are selectable for final approval in the second level of patch approval; and
in response to one or more patches of the approved list of patches being selected for final approval in the second level of patch approval from the change request graphical user interface, install the one or more patches into the computing environment at the scheduled time period.

16. The computing system of claim 15, wherein the instructions to scan the target assets further comprise instructions that when executed by at least the processor cause the processor to:
reduce an amount of scanning performed by:
selecting the subset of scanning modules from the available set of scanning modules based on asset types of the target assets, wherein the asset types are determined at least in part on the configuration properties of the target assets;

wherein scanning modules that are configured to scan the asset types of the target assets are selected for the subset of scanning modules;

wherein scanning modules, that are configured to scan different asset types that are not part of the target assets, are not selected for the subset of scanning modules; and scanning the target assets for the security vulnerabilities by executing the subset of scanning modules selected.

17. The computing system of claim 15, wherein the instructions to obtain the metadata associated with the target assets includes querying a configuration management database that contains the metadata associated with the target assets that are present within the computing environment.

18. The computing system of claim 15, further comprising instructions that when executed by at least the processor cause the processor to:

after scanning the target assets for security vulnerabilities:

categorize data points collected during the scan against a common vulnerabilities and exposures (CVE) database to determine which security vulnerabilities are present;

obtain a CVE severity score for each of the security vulnerabilities from the CVE database; and modify the CVE severity score for each of the security vulnerabilities based on one or more risk factors that apply to the target assets;

wherein the one or more risk factors are determined from the metadata and the configuration properties of the target assets.

19. The computing system of claim 15, further comprising instructions that when executed by at least the processor cause the processor to:

after scanning the target assets for security vulnerabilities:

generate a severity score for each of the security vulnerabilities found based at least in part on a potential damage to the target assets caused by the security vulnerability;

wherein the potential damage is determined based at least in part on the configuration properties from the metadata of the target assets.

20. The computing system of claim 19, further comprising instructions that when executed by at least the processor cause the processor to:

determine the potential damage to the target assets by determining one or more risk factors associated with the target assets including:

a number of affected users associated with the target assets in the IP address range;

a number of dependent servers that are configured to depend on a target server within the target assets, wherein the dependent servers are not within the IP address range; and a number of affected applications that are installed on the target assets.

* * * * *